United States Patent
Yang

(10) Patent No.: US 9,621,704 B2
(45) Date of Patent: Apr. 11, 2017

(54) METHOD AND SYSTEM FOR FILE SYNCHRONIZATION

(71) Applicant: JRD COMMUNCATION INC., Shenzhen (CN)

(72) Inventor: Zhibing Yang, Shenzhen (CN)

(73) Assignee: JRD COMMUNICATION INC., Shenzhen (CN)

(*) Notice: Subject to any disclaimer, the term of this patent is extended or adjusted under 35 U.S.C. 154(b) by 0 days.

(21) Appl. No.: 14/911,949

(22) PCT Filed: Apr. 13, 2015

(86) PCT No.: PCT/CN2015/076460
§ 371 (c)(1),
(2) Date: Feb. 12, 2016

(87) PCT Pub. No.: WO2016/101441
PCT Pub. Date: Jun. 30, 2016

(65) Prior Publication Data
US 2016/0352888 A1   Dec. 1, 2016

(30) Foreign Application Priority Data

Dec. 23, 2014 (CN) .......................... 2014 1 0811344

(51) Int. Cl.
*H04M 3/00* (2006.01)
*H04M 1/725* (2006.01)
(Continued)

(52) U.S. Cl.
CPC ...... *H04M 1/72533* (2013.01); *H04L 65/601* (2013.01); *H04L 67/02* (2013.01); *H04L 67/06* (2013.01)

(58) Field of Classification Search
CPC . H04W 8/247; H04W 88/02; H04M 1/72519; H04L 29/0854; H04B 7/2125
USPC ....... 455/418, 550.1, 557; 370/324; 709/248
See application file for complete search history.

(56) References Cited

U.S. PATENT DOCUMENTS 9,003,299 B2 * 4/2015 Freedman .............. H01B 7/292
715/745
2009/0106455 A1 * 4/2009 Xu ...................... H04L 67/1095
709/248
(Continued)

FOREIGN PATENT DOCUMENTS

CN     102523529 A     6/2012
CN     103295609 A     9/2013
(Continued)

*Primary Examiner* — Danh Le
(74) *Attorney, Agent, or Firm* — Shimokaji IP

(57) ABSTRACT

A method and system for file synchronization may include sending, by a first device, a file synchronization request to a server; receiving, by the server, the file synchronization request from the first device; determining, according to first file synchronization information and at least one piece of second fine synchronization information, the latest state information of the file to be synchronized among the first state information and the at least one piece of second state information; sending the latest state information of the file to be synchronized to the first device; receiving, by the first device, the latest state information of the file to be synchronized sent by the server; and performing synchronization operations on the file according to the latest state information of the file to be synchronized. In such a way, the present invention can allow a file to be synchronously used between different devices.

20 Claims, 4 Drawing Sheets

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 2011/0261810 A1* | 10/2011 | Trovel | ............... | H04M 3/42365 |
| | | | | 370/352 |
| 2013/0040661 A1* | 2/2013 | Grube | .................... | H04W 4/22 |
| | | | | 455/456.3 |
| 2013/0166729 A1* | 6/2013 | Gole | ................ | G06F 17/30578 |
| | | | | 709/224 |
| 2013/0227013 A1* | 8/2013 | Maskatia | .............. | H04L 65/403 |
| | | | | 709/204 |
| 2013/0260758 A1* | 10/2013 | Zhao | .................... | H04W 36/14 |
| | | | | 455/436 |
| 2013/0290440 A1* | 10/2013 | Pratt | ....................... | H04L 51/38 |
| | | | | 709/206 |
| 2014/0156599 A1* | 6/2014 | Quan | ...................... | A63F 13/10 |
| | | | | 707/634 |
| 2015/0347548 A1* | 12/2015 | Mortensen | .............. | G06F 11/14 |
| | | | | 707/618 |

FOREIGN PATENT DOCUMENTS

| | | | |
|---|---|---|---|
| CN | 103475939 A | | 12/2013 |
| CN | 103607461 A | | 2/2014 |
| CN | 103634647 A | | 3/2014 |
| CN | 104185039 A | | 3/2014 |
| WO | 2013139239 A1 | | 9/2013 |

\* cited by examiner

METHOD AND SYSTEM FOR FILE SYNCHRONIZATION

TECHNICAL FIELD

The present invention relates to the field of electronic devices, in particular to a method and system for file synchronization.

BACKGROUND

With the continuous development of TV sets toward intelligence and networking, people may conduct various operations, for example, watching movies and live programs, listening to music, and viewing pictures by installing related applications on a smart TV set. As important handheld devices in people's daily life, wireless communication devices play an increasing important role in people's life, by which people may also conduct various operations, for example, reading e-books, watching movies and live programs, listening to music, viewing pictures, browsing a web, and updating a microblog.

People may use smart TV sets at home and use wireless communication devices elsewhere. In many circumstances, an identical or similar operation may be conducted both on the smart TV set and on the wireless communication device. For example, a person, who watches a movie at home, may continuously watch this movie by his/her smart wireless communication device elsewhere. A person who listens to a certain a piece of music by the smart TV set at home, may continuously listen to a piece of music by his/her smart wireless communication device elsewhere. A person who browses a web at home may continuously browse the web by his/her smart wireless communication device elsewhere. However, synchronization between a smart TV set and a smart wireless communication device may be difficult. When a user, who is watching a movie by the smart TV set at home, needs to leave after watching half of the movie, and decides to continuously watch this movie by the wireless communication device elsewhere, the user may find the application for movies in the smart device, then search for the movie, start playing this movie, and manually adjust the progress to a same point of time as that of the smart TV set. Similarly, repeated operations may be conducted for a user who is listening to music, browsing a web or updating a microblog or the like. It may be difficult to find the location of the previous operation. As a result, the user experience may be affected.

SUMMARY

The present invention may provide a method and system for file synchronization, which may allow a file to be synchronously used between different devices and thus improve the user experience.

A system for file synchronization is provided, including a first device, a server and at least one second device;

The first device may include: a first sending module, configured to send a file synchronization request to the server, the file synchronization request including a file identifier of a file to be synchronized and an identifier of the first device;

The server may include: a first receiving module, configured to receive the file synchronization request from the first device; a search module, configured to search, according to the file synchronization request, first file synchronization information sent by the first device and at least one piece of second file synchronization information sent by the at least one second device, which are both stored locally, wherein the first file synchronization information includes the file identifier of the file to be synchronized, first state information of the file to be synchronized and the identifier of the first device, and the second file synchronization information includes the file identifier of the file to be synchronized, second state information of the file to be synchronized and an identifier of the second device; a determination module, configured to determine, according to the first file synchronization information and the at least one piece of second file synchronization information, the latest state information of the file to be synchronized among the first state information and the at least one piece of second state information; and a first sending module, configured to send the latest state information of the file to be synchronized to the first device;

The first device may further include: a receiving module, configured to receive the latest state information of the file to be synchronized sent by the server; and a synchronization module, configured to perform synchronization operations on the file according to the latest state information of the file to be synchronized; wherein the first device further includes: a second sending module, configured to send the first file synchronization information to the server.

The server may further include: a second receiving module, configured to receive the first file synchronization information sent by the first device and store the first file synchronization information locally; and wherein the at least one second device includes: a sending module, configured to send the at least one piece of second file synchronization information to the server.

The server may further include: a third receiving module, configured to receive the at least one piece of second file synchronization information sent by the at least one second device and store the at least one piece of second file synchronization information locally. The first device may be a mobile device, and the at least one second device may be a smart TV set.

The file to be synchronized may include at least one of a video play file, a music play file, a browser file, a microblog client file and an e-book reader file.

A method for file synchronization may include the following steps:

sending, by a first device, a file synchronization request to a server, the file synchronization request including a file identifier of a file to be synchronized and an identifier of the first device;

receiving, by the server, the file synchronization request from the first device; searching, according to the file synchronization request, first file synchronization information sent by the first device and at least one piece of second file synchronization information sent by at least one second device, which are both stored locally, wherein the first file synchronization information includes the file identifier of the file to be synchronized, first state information of the file to be synchronized and the identifier of the first device, and the second file synchronization information includes the file identifier of the file to be synchronized, second state information of the file to be synchronized and an identifier of the second device; determining, according to the first file synchronization information and the at least one piece of second file synchronization information, the latest state information of the file to be synchronized among the first state information and the at least one piece of second state information; and sending the latest state information of the file to be synchronized to the first device;

receiving, by the first device, the latest state information of the file to be synchronized sent by the server; and performing synchronization operations on the file according to the latest state information of the file to be synchronized.

Before the step of sending, by the first device, a file synchronization request to a server, the method further may include the following steps:

sending, by the first device, the first file synchronization information to the server; and receiving, by the server, the first file synchronization information sent by the first device, and storing the first file synchronization information locally.

Before the step of sending, by the first device, a file synchronization request to a server, the method further includes the following steps:

sending, by the at least one second device, the at least one piece of second file synchronization information to the server; and receiving, by the server, the at least one piece of second file synchronization information sent by the at least one second device, and storing the at least one piece of second file synchronization information locally.

The first device may be a mobile device, and the at least one second device may be a smart TV set.

The file to be synchronized may include at least one of a video play file, a music play file, a browser file, a microblog client file and an e-book reader file.

The present invention may employ a system for file synchronization including a first device, a server and at least one second device;

The first device may include: a first sending module, configured to send a file synchronization request to the server, the file synchronization request including a file identifier of a file to be synchronized and an identifier of the first device;

The server may include: a first receiving module, configured to receive the file synchronization request from the first device;

a search module, configured to search, according to the file synchronization request, first file synchronization information sent by the first device and at least one piece of second file synchronization information sent by the at least one second device, which are both stored locally, wherein the first file synchronization information includes the file identifier of the file to be synchronized, first state information of the file to be synchronized and the identifier of the first device, and the second file synchronization information includes the file identifier of the file to be synchronized, second state information of the file to be synchronized and an identifier of the second device;

a determination module, configured to determine, according to the first file synchronization information and the at least one piece of second file synchronization information, the latest state information of the file to be synchronized among the first state information and the at least one piece of second state information; and a first sending module, configured to send the latest state information of the file to be synchronized to the first device;

The first device further may include: a receiving module, configured to receive the latest state information of the file to be synchronized sent by the server; and a synchronization module, configured to perform synchronization operations on the file according to the latest state information of the file to be synchronized.

The first device further may include: a second sending module, configured to send the first file synchronization information to the server;

The server further may include: a second receiving module, configured to receive the first file synchronization information sent by the first device and store the first file synchronization information locally.

The at least one second device may include: a sending module, configured to send the at least one piece of second file synchronization information to the server;

The server further may include: a third receiving module, configured to receive the at least one piece of second file synchronization information sent by the at least one second device and store the at least one piece of second file synchronization information locally.

The first device may be a mobile device, and the at least one second device may be a smart TV set.

The file to be synchronized may include at least one of a video play file, a music play file, a browser file, a microblog client file and an e-book reader file.

The present invention may include first file synchronization information sent by a first device and at least one piece of second file synchronization information sent by at least one second device are stored by a server; according to the first file synchronization information and the at least one piece of second fine synchronization information, the latest state information of the file to be synchronized may be determined among the first state information and the at least one piece of second state information; the latest state information of the file to be synchronized may be sent by the server to the first device requiring file synchronization; and synchronization operations on the file may be performed by the first device according to the latest state information of the file to be synchronized to adjust the file to the latest state corresponding to the latest state information stored in the server, the file may be synchronously used between different devices, and manual adjustment of the state of the file and inaccurate manual adjustment may be avoided. Accordingly, the fluency of operations of devices is may be improved, and the user experience may be improved.

DETAILED DESCRIPTION

Figure 1:
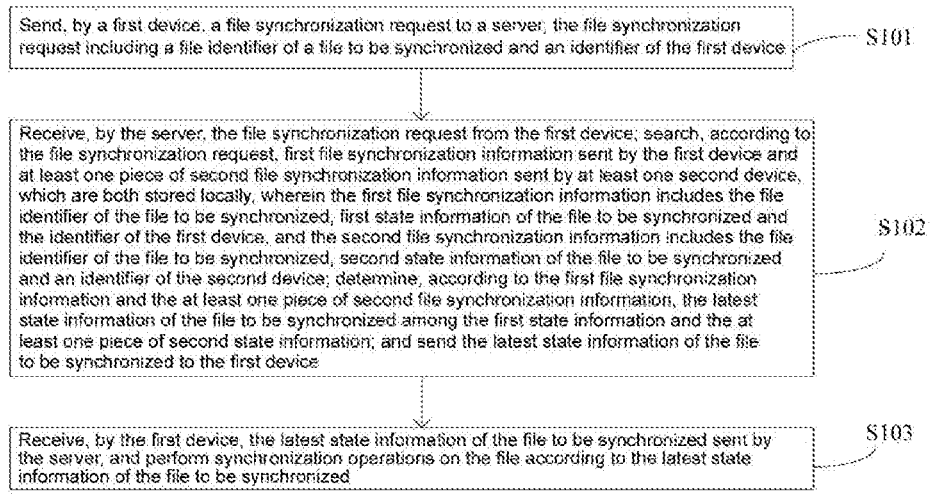
FIG. 1 is a flowchart of an implementation of a method for file synchronization according to the present invention.

FIG. 1 is a flowchart of an implementation of a method for file synchronization that may include the following steps:

S101: A first device may send a file synchronization request to a server, the file synchronization request including a file identifier of a file to be synchronized and an identifier of the first device;

When the first device requires file synchronization, the first device may send a file synchronization request to the server. The file identifier of the file to be synchronized may be an identifier uniquely corresponding to the file to be synchronized and used for identifying the file to be synchronized, and the identifier of the first device may be an identifier corresponding to the first device and used for identifying the first device.

S102: The server may receive the file synchronization request from the first device; searches, according to the file synchronization request, first file synchronization information sent by the first device and at least one piece of second file synchronization information sent by at least one second device, which may both be stored locally, wherein the first file synchronization information may include the file identifier of the file to be synchronized, first state information of the file to be synchronized and the identifier of the first device, and the second file synchronization information may include the file identifier of the file to be synchronized, second state information of the file to be synchronized and an identifier of the second device; may determine, according to the first file synchronization information and the at least one piece of second file synchronization information, the latest state information of the file to be synchronized among the first state information and the at least one piece of second state information; and may send the latest state information of the file to be synchronized to the first device;

The first state information of the file to be synchronized may be sent by the first device, when the first device stops using the last file to be synchronized. The identifier of the second device may be an identifier corresponding to the second device and used for identifying the second device. The second state information of the file to be synchronized may be a state of the file to be synchronized, sent by the second device, when the second device stops using the last file to be synchronized.

During the specific implementation, the server may establish a correspondence between the identifier of the first device and the identifier of the second device. It may be convenient for the server to search according to the correspondence. Further, in order to more quickly realize the file synchronization between the first device and the second device and to improve the search speed of the server, the identifier of the first device may be made the same as the identifier of the second device.

For example, the server may search, according to the file synchronization request from the first device, the first file synchronization information sent by the first device and the second file synchronization information sent by the second device having the same identifier as that of the first device. Then, the server may further search, according to the file identifier of the file to be synchronized, first state information of the file to be synchronized from the first file synchronization information and second state information from the second file synchronization information, may compare the first state information with the second state information to determine the latest state information of the file to be synchronized stored in the server, and finally, may send the latest state information to the first device. The latest state information may be a state of the file to be synchronized when the first device or second device stops using it the last time.

In other implementations, the identifier of the first device and the identifier of the second device may also be different identifiers having a correspondence. The server may search, according to the file synchronization request from the first device, first state information of the file to be synchronized by the first device and second state information of the file to be synchronized by the second device having a device identifier corresponding to that of the first device, both of which may be stored by the server, compare the first state information with the second state information to determine the latest state information of the file to be synchronized stored in the server, and finally, send the latest state information to the first device.

In the implementation of the present invention, after receiving the first file synchronization information and the second file synchronization information separately sent by the first device and second device both having a same identifier, the server may search, according to the file identifier of the file to be synchronized, the first state information and second state information of the file to be synchronized, and compare the first state information or the second state information with the state information of the file to be synchronized stored in the server to determine the latest state information among the first state information or second state information and the state information of the file to be synchronized stored in the server.

If the first state information or second state information is the latest state information, the latest state information may be stored, and the old state information stored in the server may be cleared away. If the state information of the file to be synchronized stored in the server is the latest state information, the server may continuously store the latest state information in the server without storing the first state information or second state information. In this way, the server may store only one piece of state information with regard to one file, so that the storage space may be saved. Thus, upon receiving the file synchronization request from the first device, the server may directly send the latest state information to the first device without needing to perform a comparison operation, so that the response speed may be improved.

S103: The first device may receive the latest state information of the file to be synchronized sent by the server, and perform synchronization operations on the file according to the latest state information of the file to be synchronized.

The first device may adjust, according to the latest state information of the file to be synchronized sent by the server, the file to be synchronized to a state corresponding to the latest state information, so as to realize the synchronization of the file between different devices.

In contrast to the prior art, in the implementation of the present invention, first file synchronization information sent by a first device and at least one piece of second file synchronization information sent by at least one second device may be stored by a server; according to the first file synchronization information and the at least one piece of second fine synchronization information, the latest state information of the file to be synchronized may be determined among the first state information and the at least one piece of second state information; the latest state information of the file to be synchronized may be sent by the server to the first device requiring file synchronization; and synchronization operations on the file may be performed by the first device according to the latest state information of the file to be synchronized to adjust the file to a latest state corresponding to the latest state information stored in the server, the file may be synchronously used between different devices, manual adjustment of the state of the file when the same file is to be used between different devices and inaccurate manual adjustment may be avoided. Accordingly, the fluency of operations of a device may be improved, and the user experience may be improved.

Figure 2:
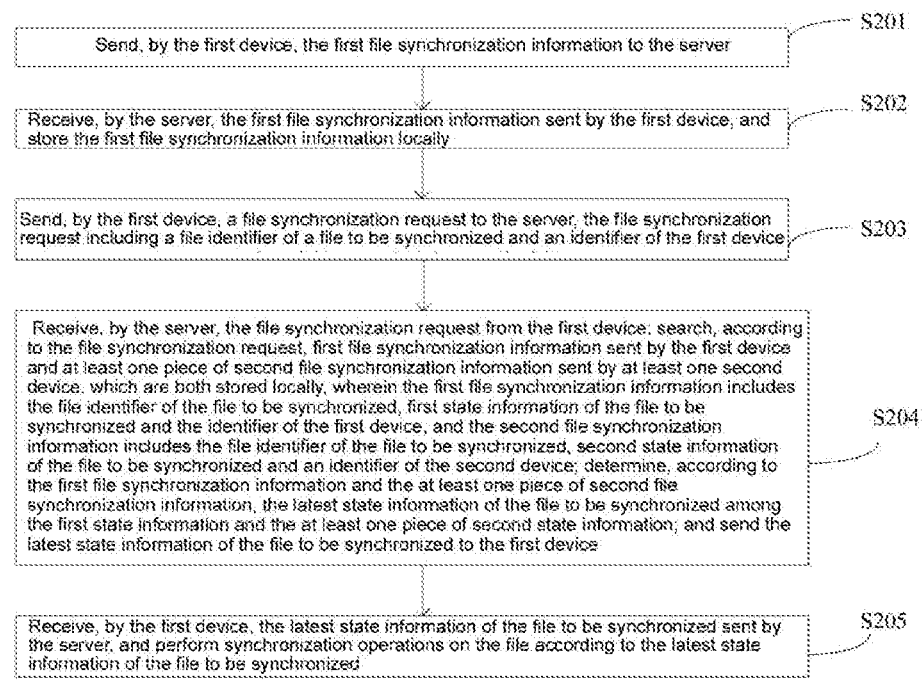
FIG. 2 is a flowchart of another implementation of the method for file synchronization according to the present invention.

FIG. 2 is a flowchart of another implementation of the method for file synchronization which may be substantially similar to the implementation of FIG. 1. The method for file synchronization in this implementation may include:

S201: A first device may send first file synchronization information to a server;

Generally, the time for the first device to send the first file synchronization information to the server may be the time when the first device stops using a file to be synchronized. It may be possible to actively stop using a file to be synchronized by the user, or passively stop using the file to be synchronized by the first device due to an abnormal situation. An abnormal situation may include sudden shutdown of the first device, flash exit of the file to be synchronized, or the like. Of course, in other implementations, during the use of the file to be synchronized, the first device may send the first file synchronization information to the server at regular intervals.

S202: The server may receive the first file synchronization information sent by the first device, and store the first file synchronization information locally;

The server may allocate, according to an identifier of the first device, a storage space to the first device for storing the first file synchronization information sent by the first device.

S203: The first device may send a file synchronization request to the server, and the file synchronization request may include a file identifier of a file to be synchronized and an identifier of the first device;

S204: The server may receive the file synchronization request from the first device; search, according to the file synchronization request, first file synchronization information sent by the first device and at least one piece of second file synchronization information sent by at least one second device, which may be both stored locally, wherein the first file synchronization information may include the file identifier of the file to be synchronized, first state information of the file to be synchronized and the identifier of the first device, and the second file synchronization information may include the file identifier of the file to be synchronized, second state information of the file to be synchronized and an identifier of the second device; may determine, according to the first file synchronization information and the at least one piece of second file synchronization information, the latest state information of the file to be synchronized among the first state information and the at least one piece of second state information; and may send the latest state information of the file to be synchronized to the first device.

S205: The first device may receive the latest state information of the file to be synchronized sent by the server, and may perform synchronization operations on the file according to the latest state information of the file to be synchronized.

Figure 3:
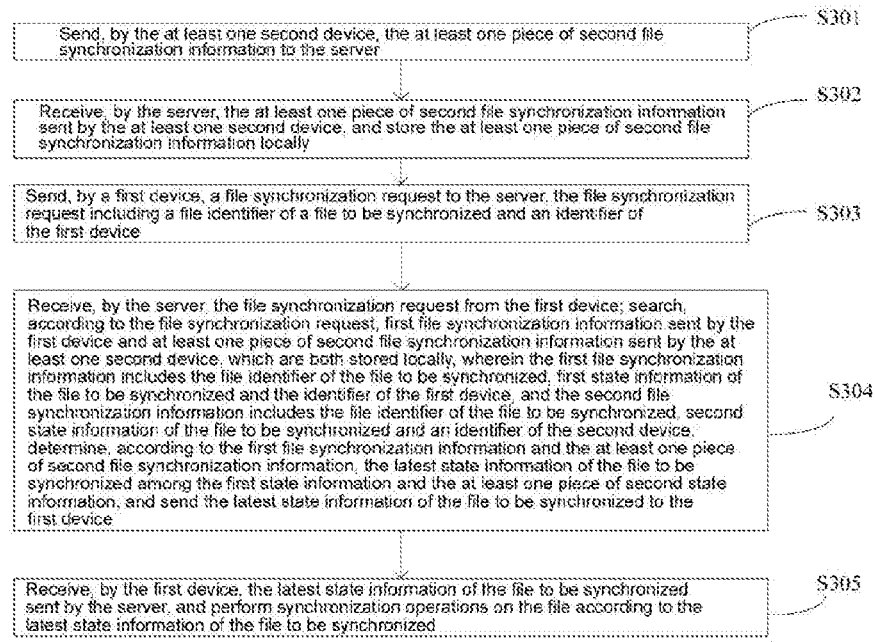
FIG. 3 is a flowchart of yet another implementation of the method for file synchronization according to the present invention.

FIG. 3 is a flowchart of another implementation of the method for file synchronization and may be substantially similar to the implementation of FIG. 1. The method for file synchronization in this implementation may include the following steps:

S301: At least one second device may send at least one piece of second file synchronization information to a server;

Generally, the time for the at least one second device to send the at least one piece of second file synchronization information to the server may be the time when the at least one second device stops using a file to be synchronized. It may be possible to actively stop using a file to be synchronized by the user, or passively stop using the file to be synchronized by the at least one second device due to an abnormal situation. The abnormal situation may include sudden shutdown of the at least one second device, flash exit of the file to be synchronized, or the like. Of course, in other implementations, during the use of the file to be synchronized, the at least one second device may send the second file synchronization information to the server at regular intervals. The at least one second device may be one second device, two second devices, more than two second devices, or the like. In other words, the implementation of the present invention may realize the synchronization of a same file between two or more than two devices.

S302: The server may receive the at least one piece of second file synchronization information sent by the at least one second device, and may store the at least one piece of second file synchronization information locally;

The server may allocate, according to an identifier of the at least one second device, a storage space to the at least one second device for storing the second file synchronization information sent by the at least one second device.

S303: A first device may send a file synchronization request to the server, and the file synchronization request may include a file identifier of a file to be synchronized and an identifier of the first device.

S304: The server may receive the file synchronization request from the first device; search, according to the file synchronization request, first file synchronization information sent by the first device and at least one piece of second file synchronization information sent by the at least one second device, which may be both stored locally, wherein the first file synchronization information includes the file identifier of the file to be synchronized, first state information of the file to be synchronized and the identifier of the first device, and the second file synchronization information may include the file identifier of the file to be synchronized, second state information of the file to be synchronized and an identifier of the second device; may determine, according to the first file synchronization information and the at least one piece of second file synchronization information, the latest state information of the file to be synchronized among the first state information and the at least one piece of second state information; and may send the latest state information of the file to be synchronized to the first device.

S305: The first device may receive the latest state information of the file to be synchronized sent by the server, and may perform synchronization operations on the file according to the latest state information of the file to be synchronized.

In an embodiment, allowing the first device and the second device to have a same identifier may be realized by registering an account on the server and allowing the first device and the second device to share the account. When the first device logs in the account, the account may be a device identifier of the first device; and when the second device logs in the account, the account may be a device identifier of the second device. The server can manage file synchronization information of different devices using the account through the account. A user may register an account through the first device, or may register an account through the second device.

In an embodiment, the first device or the second device may be a mobile device, for example, a smart phone, a tablet computer or the like. The first device or the second device may also be a smart TV set. For example, when the first device is a mobile device and the second device is a smart TV set, or when the first device is a smart TV set and the second device is a mobile device, a synchronous use of a same file between the mobile device and the smart TV set may be utilized. The mobile device may be used by a user when he/she leaves a building, while the smart TV set is usually used by a user at home. Furthermore, a user may realize the synchronous use of a file by a mobile device and a smart TV set when the user is at home or leaves the home. When the user stops using the file by the smart TV set at home, the smart TV set may send the file state information at this moment to the server, and the server may determine, according to the file state information sent by the smart TV set and the state information of the file stored in the server, the latest state information of the file and store the latest state information. When the user continuously uses the file by a mobile device when he/she leaves a building, the mobile device may send a file synchronization request to the server, the server sends the latest state information of the file to the mobile device according to the file synchronization request, and the mobile device may adjust the file to a latest state according to the latest state information, so that the user may start to use the file by the mobile device from the latest state of the file, without needing to manually adjust the state of the file to allow the state of the file to be identical to the state when the user stops using the file by the smart TV set. Similarly, when the user stops using the file by the mobile device, the mobile device may send the file state information to the server, and the server can determine, according to the file state information sent by the mobile device and the state information of the file stored in the server, the latest state information of the file and store the latest state information. When the user goes home and continuously uses the file by the smart TV set, the smart TV set may send a file synchronization request to the server, the server may send the latest state information of the file to the smart TV set according to the file synchronization request, and the smart TV set may adjust the file to a latest state according to the latest state information, so that the user may start to use the file by the smart TV set from the latest state of the file, without needing to manually adjust the state of the file to allow the state of the file to be identical to the state when the user stops using the file by the mobile device.

In an embodiment, it may not be required to synchronize all files used by a mobile device or a smart TV set, and some files may be particular files on the mobile device or the smart TV set and may not be used on other devices. For example, a camera application on the mobile device, or other files may not be required to be synchronized although they may be used on other devices, such as, for example, a calculator application. Therefore, when the mobile device or smart TV set stops using these files not to be synchronized, the mobile device or smart TV set may not send the state information of the files to a server; and, when the mobile device or smart TV set starts using these files not to be synchronized, the mobile device or smart TV set may not send a file synchronization request to the server.

In an embodiment, the file to be synchronized may include at least one of a video play file, a music play file, a browser file, a microblog client file and an e-book reader file. The state information corresponding to these files to be synchronized may be a point of time of a video played by the video play file, a point of time of a piece of music played by the music play file, the URL of a web browsed by the browser file and a part of the web already browsed, a certain microblog browsed by the microblog client file, or an e-book file browsed by the e-book reader file and a part of the e-book file already read. It can be noted that, the latest state information has different meanings with respect to different files. For example, if the file to be synchronized is a video play file or a music play file, the state of the file is more recent if the time of playing a video or a piece of music is later. If the file to be synchronized is a browser file, a microblog client file, an e-book reader file or the like, it is subject to the point of time of using the file. The state of the file is more recent if the time of using the file is closer to the current point of time.

The process of realizing file synchronization between a mobile device and a second device will be described as below by taking a mobile device as the first device and a smart TV set as the second device as an example.

Figure 4:
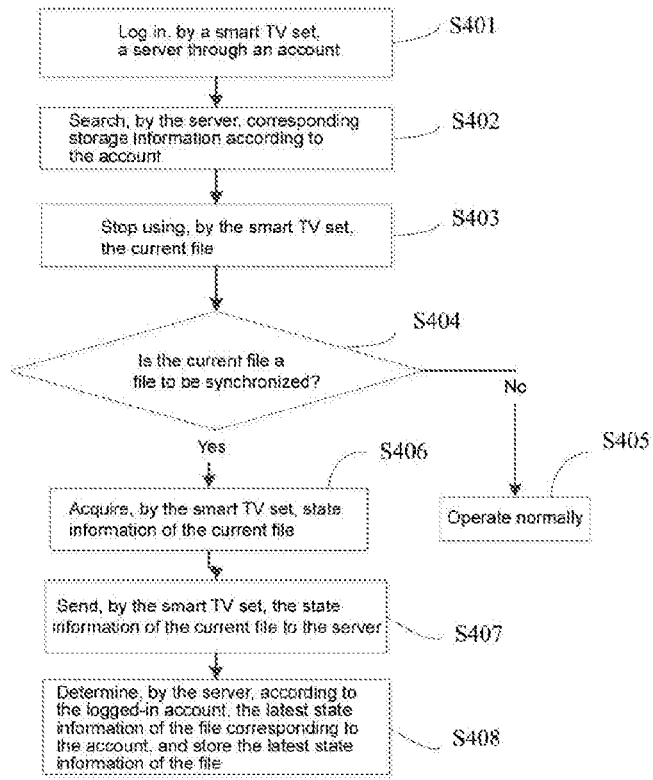
FIG. 4 is a flowchart of sending, by a smart TV set, file synchronization information to a server and storing the file synchronization information by the server.

FIG. 4 describes sending, by a smart TV set, file synchronization information to a server and storing the file synchronization information by the server, and may include the following steps:

S401: A smart TV set may log in a server through an account;

S402: The server may search storage information corresponding to the account according to the account;

The steps S401 and S402 may be performed while the smart TV set is turned on, for establishing a connection between the smart TV set and the server. The storage information may include synchronization information of the file, stored by the server, corresponding to the logged-in account.

S403: The smart TV set may stop using the current file;

S404: It may be determined whether the current file is a file to be synchronized. If NO, the process may proceed to S405; and, if YES, the process may proceed to S406.

S405: The smart TV set may operate normally, namely, the smart TV set may stop using the current file normally, without performing other operations;

S406: The smart TV set may acquire state information of the current file;

S407: The smart TV set may send the state information of the current file to the server;

S408: The server may determine, according to the logged-in account, the latest state information of the file corresponding to the account, and may store the latest state information; and the server may compare the state information of the current file sent by the smart TV set, with the state information of the current file stored in the server, to determine the latest state information of the current file, and store the latest state information.

Specifically, if a user who watches a movie by a video play file via a smart TV set, exits the video play file when the movie has been played to a point of time of 52' 23", the smart TV set may send the point of time information to the server; and the server, after receiving the point of time information, may compare the point of time information with the point of time information corresponding to the video play file stored in the server to determine the latest state information of the current video play file, and may store the latest state information. For example, if the state information of the video play file stored in the server indicates that the movie has been played to a point of time of 40', the point of time of 52' 23" sent by the smart TV set may be the latest state information of the video play file. In this case, the server may cover the previously stored point of time of 40' with the point of time 52' 23" as the latest state information of the video play file. If the state information of the video play file stored in the server indicates that the movie has been played to a point of time of 55', since this point of time is a later state compared to the point of time of 52' 23" sent by the smart TV set, the server continuously keeps the point of time of 55', as the latest state information of the video play file without storing the point of time information of 52' 23" sent by the smart TV set.

Figure 5:
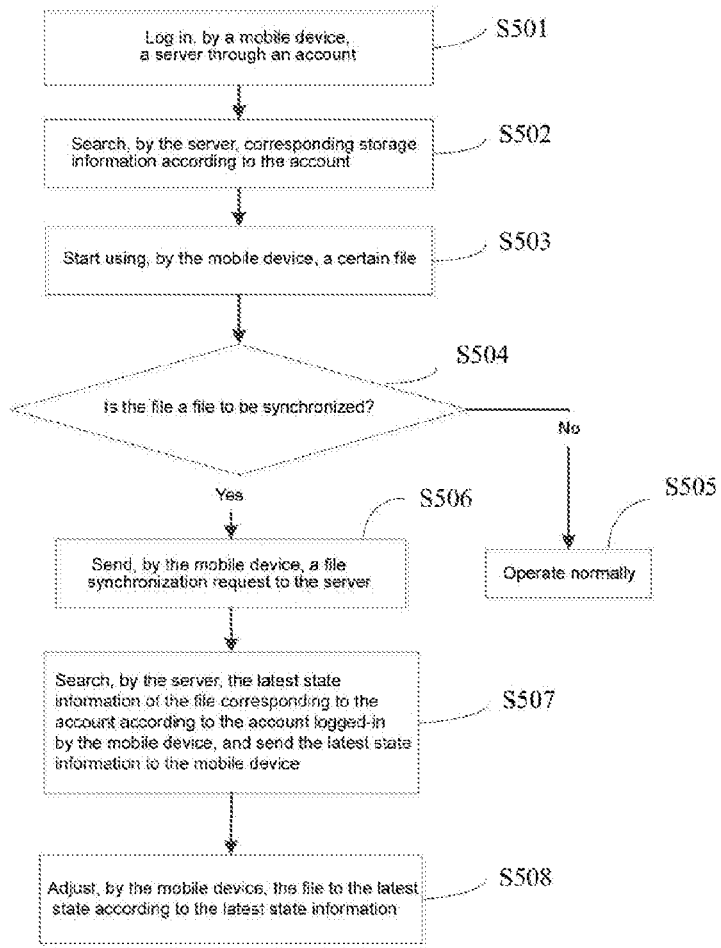
FIG. 5 is a flowchart of sending, by a mobile device, a file synchronization request to a server and realizing the file synchronization.

FIG. 5 describes sending, by a mobile device, a file synchronization request to a server and realizing the file synchronization, and may include the following steps:

S501: A mobile device may log in a server through an account;

S502: The server may search corresponding storage information based on the account;

The steps S501 and S502 may be performed while the mobile device is turned on, for establishing a connection between the mobile device and the server; the storage information may include synchronization information of the file, stored by the server, corresponding to the logged-in account;

S503: The mobile device may start using a certain file;

S504: It may be determined whether the current file is a file to be synchronized. If NO, the process may proceed to S505; and, if YES, the process may proceed to S506;

S505: The mobile device may operate normally; that is, the mobile device may start using the current file normally, without performing other operations;

S506: The mobile device may send a file synchronization request to the server;

S507: The server may search, according to the account logged-in by the mobile device, the latest state information of the file corresponding to the account, and may send the latest state information to the mobile device;

S508: The mobile device may adjust, according to the latest state information, the file to a latest state according to the latest state information.

Specifically, if a user opens a video play file on a mobile device, the mobile device may send a file synchronization request to a server, and the server may search the latest state information of the file corresponding to the account according to the account logged-in by the mobile device, for example, a point of time of 52' 23", and may send the latest state information to the mobile device. Then, the mobile device may adjust, according to the latest state information, the video play file to 52' 23", and may start playing from this point of time. In this way, the synchronous use of the video play file on the mobile device may be realized.

Figure 6:
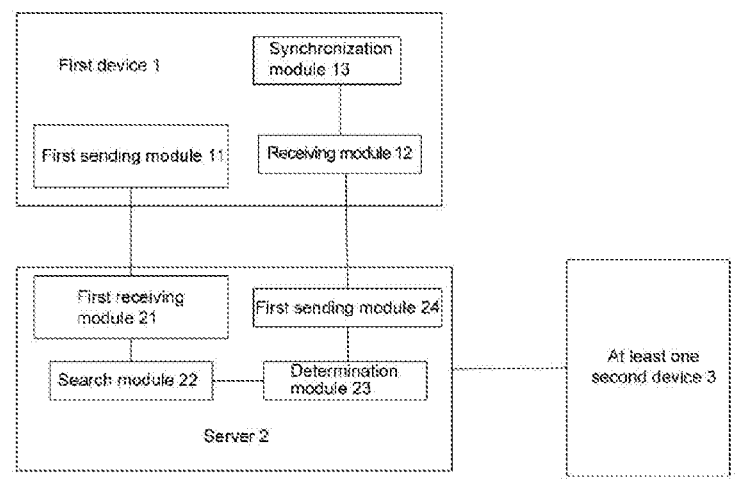
FIG. 6 is a structural diagram of an implementation of a system for file synchronization according to the present invention.

In an embodiment, the present invention may provide a system for file synchronization. The system may realize the method for file synchronization as described in the above implementations. As shown in FIG. 6, the system may include a first device 1, a server 2 and at least one second device 3.

The first device 1 may include:
a first sending module 11, configured to send a file synchronization request to the server, the file synchronization request comprising a file identifier of a file to be synchronized and an identifier of the first device;

The server 2 may include:
a first receiving module 21, configured to receive the file synchronization request from the first device 1;
a search module 22, configured to search, according to the file synchronization request, first file synchronization information sent by the first device 1 and at least one piece of second file synchronization information sent by the at least one second device 3, which may be both stored locally, wherein the first file synchronization information comprises the file identifier of the file to be synchronized, first state information of the file to be synchronized and the identifier of the first device, and the second file synchronization information comprises the file identifier of the file to be synchronized, second state information of the file to be synchronized and an identifier of the second device;
a determination module 23, configured to determine, according to the first file synchronization information and the at least one piece of second file synchronization information, the latest state information of the file to be synchronized among the first state information and the at least one piece of second state information; and
a first sending module 24, configured to send the latest state information of the file to be synchronized to the first device 1;

The first device 1 further may include:
a receiving module 12, configured to receive the latest state information of the file to be synchronized sent by the server 2; and
a synchronization module 13, configured to perform synchronization operations on the file according to the latest state information of the file to be synchronized.

In contrast to the prior art, first file synchronization information sent by a first device 1 and at least one piece of second file synchronization information sent by at least one second device 3 may be stored by the server 2; according to the first file synchronization information and the at least one piece of second fine synchronization information, the latest state information of the file to be synchronized may be determined among the first state information and the at least one piece of second state information; the latest state information of the file to be synchronized may be sent by the server to the first device 1 requiring file synchronization; and synchronization operations on the file may be performed by the first device 1 according to the latest state information of the file to be synchronized to adjust the file to a latest state corresponding to the latest state information stored in the server 2, the file may be synchronously used between different devices, and manual adjustment of the state of the file and inaccurate manual adjustment may be avoided. Accordingly, the fluency of operations of a device may be improved, and the user experience may be thus improved.

Figure 7:
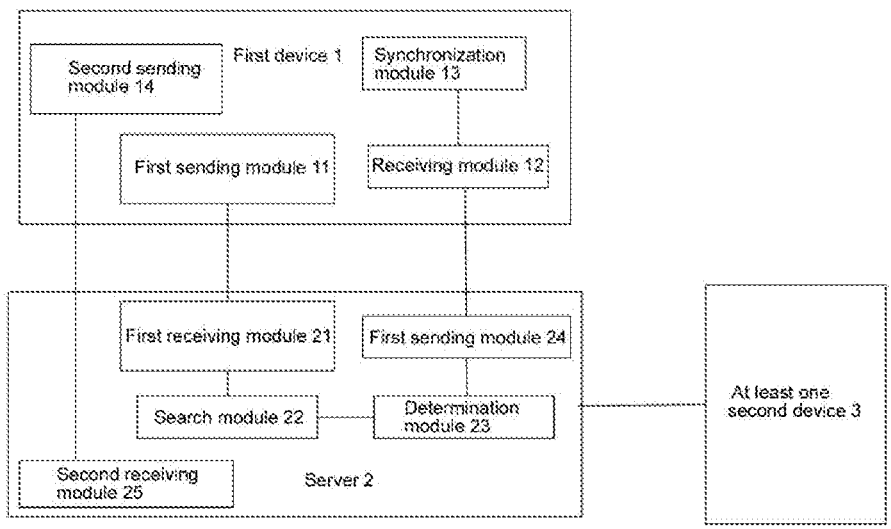
FIG. 7 is a structural diagram of another implementation of the system for file synchronization according to the present invention.

As shown in FIG. 7, in another implementation of the system for file synchronization based on the implementation as shown in FIG. 6, the first device 1 may further include:
a second sending module 14, configured to send the first file synchronization information to the server 2;

The server 2 may further comprise:
a second receiving module 25, configured to receive the first file synchronization information sent by the first device 1 and store the first file synchronization information locally.

Figure 8:
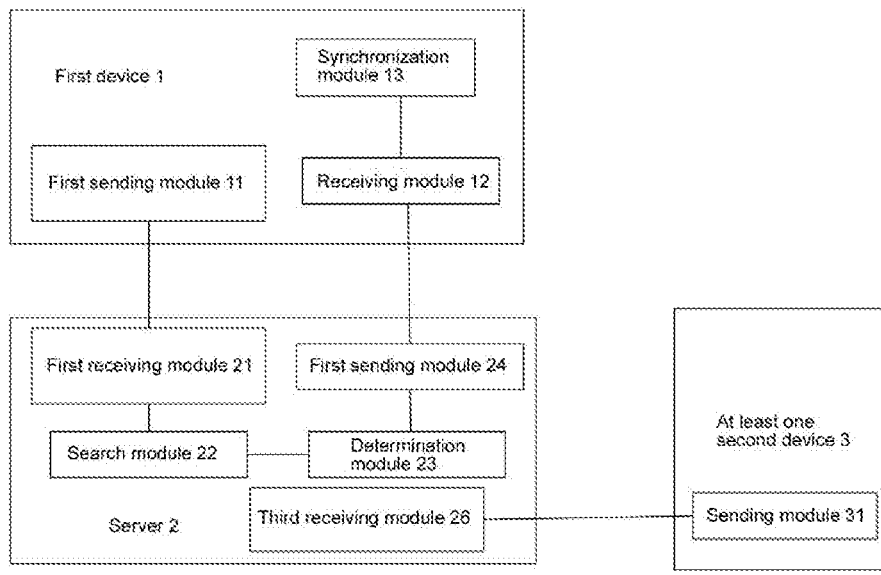
FIG. 8 is a structural diagram of yet another implementation of the system for file synchronization according to the present invention.

As shown in FIG. 8, in yet another implementation of the system for file synchronization according to the present invention, on the basis of the implementation as shown in FIG. 6, the at least one second device 3 may include:
a sending module 31, configured to send the at least one piece of second file synchronization information to the server 2;

The server 2 further may include:
a third receiving module 26, configured to receive the at least one piece of second file synchronization information sent by the at least one second device 3 and store the at least one piece of second file synchronization information locally.

The first device 1 or the second device 3 may be a mobile device, for example, a smart phone, a tablet computer or the like, or the first device 1 or the second device 3 may be a smart TV set. For example, when the first device 1 is a mobile device and the second device 3 is a smart TV set, or when the first device 1 is a smart TV set or the second device 3 is a mobile device, the implementations of the present invention may realize synchronous use of a same file between the mobile device and the smart TV set.

The file to be synchronized may include at least one of a video play file, a music play file, a browser file, a microblog client file and an e-book reader file.

The foregoing description merely shows the implementations of the present invention and is not intended to limit the scope of the present invention. All equivalent structures or equivalent flow variations made by utilizing the contents of the description and accompanying drawings of the present invention or direct or indirect application in other related technical fields may fall into the scope of the present invention.

The invention claimed is:

1. A system for file synchronization, characterized by comprising a first device, a server and at least one second device;
   wherein the first device comprises:
   a first sending module, configured to send a file synchronization request to the server, the file synchronization request comprising a file identifier of a file to be synchronized and an identifier of the first device;
   wherein the server comprises:
   a first receiving module, configured to receive the file synchronization request from the first device;
   a search module, configured to search, according to the file synchronization request, first file synchronization information sent by the first device and at least one piece of second file synchronization information sent by the at least one second device, which are both stored locally, wherein the first file synchronization information comprises the file identifier of the file to be synchronized, first state information of the file to be synchronized and the identifier of the first device, and the second file synchronization information comprises the file identifier of the file to be synchronized, second state information of the file to be synchronized and an identifier of the second device;
   a determination module, configured to determine, according to the first file synchronization information and the at least one piece of second file synchronization information, latest state information of the file to be synchronized among the first state information and the at least one piece of second state information; and
   a first sending module, configured to send the latest state information of the file to be synchronized to the first device;
   wherein the first device further comprises:
   a receiving module, configured to receive the latest state information of the file to be synchronized sent by the server; and
   a synchronization module, configured to perform synchronization operations on the file according to the latest state information of the file to be synchronized;
   wherein the first device further comprises:
   a second sending module, configured to send the first file synchronization information to the server;
   wherein the server further comprises:
   a second receiving module, configured to receive the first file synchronization information sent by the first device and store the first file synchronization information locally;
   wherein the at least one second device comprises:
   a sending module, configured to send the at least one piece of second file synchronization information to the server; and
   wherein the server further comprises:
   a third receiving module, configured to receive the at least one piece of second file synchronization information sent by the at least one second device and store the at least one piece of second file synchronization information locally.

2. The system according to claim 1, wherein the first device is a mobile device, and the at least one second device is a smart TV set.

3. The system according to claim 1, wherein the file to be synchronized comprises at least one of a video play file, a music play file, a browser file, a microblog client file and an e-book reader file.

4. The system of claim 1, wherein the latest state information is stored on the server, and previously stored state information on the server is deleted.

5. The system of claim 1, wherein the first device synchronizes the file to be synchronized between the first device and the second device by adjusting the file to be synchronized to a state corresponding to the latest state information.

6. The system of claim 1, wherein the second device sends the second file synchronization information to the server at regular intervals.

7. A method for file synchronization, wherein the method includes:
   sending, by a first device, a file synchronization request to a server, the file synchronization request comprising a file identifier of a file to be synchronized and an identifier of the first device;
   receiving, by the server, the file synchronization request from the first device;
   searching, according to the file synchronization request, first file synchronization information sent by the first device and at least one piece of second file synchronization information sent by at least one second device, which are both stored locally, wherein the first file synchronization information comprises the file identifier of the file to be synchronized, first state information of the file to be synchronized and the identifier of the first device, and the second file synchronization information comprises the file identifier of the file to be synchronized, second state information of the file to be synchronized and an identifier of the second device;
   determining, according to the first file synchronization information and the at least one piece of second file synchronization information, the latest state information of the file to be synchronized among the first state information and the at least one piece of second state information; and sending the latest state information of the file to be synchronized to the first device; and
   receiving, by the first device, the latest state information of the file to be synchronized sent by the server; and performing synchronization operations on the file according to the latest state information of the file to be synchronized.

8. The method according to claim 7, wherein, before the step of sending, by the first device, a file synchronization request to a server, the method further comprises the following steps:
   sending, by the first device, the first file synchronization information to the server; and
   receiving, by the server, the first file synchronization information sent by the first device, and storing the first file synchronization information locally.

9. The method according to claim 7, wherein, before the step of sending, by the first device, a file synchronization request to a server, the method further comprises the following steps:

sending, by the at least one second device, the at least one piece of second file synchronization information to the server; and receiving, by the server, the at least one piece of second file synchronization information sent by the at least one second device, and storing the at least one piece of second file synchronization information locally.

10. The method of claim 7, wherein the first device is a mobile device, and the at least one second device is a smart TV set.

11. The method of claim 7, wherein the file to be synchronized comprises at least one of a video play file, a music play file, a browser file, a microblog client file and an e-book reader file.

12. The method of claim 7, wherein the latest state information is stored on the server, and previously stored state information on the server is deleted.

13. The method of claim 7, wherein the first device synchronizes the file to be synchronized between the first device and the second device by adjusting the file to be synchronized to a state corresponding to the latest state information.

14. A system for file synchronization, comprising a first device, a server and at least one second device;
wherein the first device comprises:
a first sending module, configured to send a file synchronization request to the server, the file synchronization request comprising a file identifier of a file to be synchronized and an identifier of the first device;
wherein the server comprises:
a first receiving module, configured to receive the file synchronization request from the first device;
a search module, configured to search, according to the file synchronization request, first file synchronization information sent by the first device and at least one piece of second file synchronization information sent by the at least one second device, which are both stored locally, wherein the first file synchronization information comprises the file identifier of the file to be synchronized, first state information of the file to be synchronized and the identifier of the first device, and the second file synchronization information comprises the file identifier of the file to be synchronized, second state information of the file to be synchronized and an identifier of the second device;
a determination module, configured to determine, according to the first file synchronization information and the at least one piece of second file synchronization information, latest state information of the file to be synchronized among the first state information and the at least one piece of second state information; and
a first sending module, configured to send the latest state information of the file to be synchronized to the first device;
wherein the first device further comprises:
a receiving module, configured to receive the latest state information of the file to be synchronized sent by the server; and
a synchronization module, configured to perform synchronization operations on the file according to the latest state information of the file to be synchronized.

15. The system according to claim 14, wherein,
the first device further comprises:
a second sending module, configured to send the first file synchronization information to the server; and
wherein the server further comprises:
a second receiving module, configured to receive the first file synchronization information sent by the first device and store the first file synchronization information locally.

16. The system according to claim 14,
wherein the at least one second device comprises:
a sending module, configured to send the at least one piece of second file synchronization information to the server; and
wherein the server further comprises:
a third receiving module, configured to receive the at least one piece of second file synchronization information sent by the at least one second device and store the at least one piece of second file synchronization information locally.

17. The system of claim 14, wherein the first device is a mobile device, and the at least one second device is a smart TV set.

18. The system of claim 14, wherein the file to be synchronized comprises at least one of a video play file, a music play file, a browser file, a microblog client file and an e-book reader file.

19. The system of claim 14, wherein the latest state information is stored on the server, and previously stored state information on the server is deleted.

20. The system of claim 14, wherein the first device synchronizes the file to be synchronized between the first device and the second device by adjusting the file to be synchronized to a state corresponding to the latest state information.

* * * * *